United States Patent [19]

Seiler et al.

[11] Patent Number: 5,451,468

[45] Date of Patent: Sep. 19, 1995

[54] PACKAGING FILM COMPRISING A SEALING LAYER AND A SUBSTRATE LAYER

[75] Inventors: Erhard Seiler, Ludwigshafen; Werner Schoene, Schriesheim; Uwe Ballerstedt, Ludwigshafen, all of Germany

[73] Assignee: BASF Aktiengesellschaft, Ludwigshafen, Germany

[21] Appl. No.: 120,435

[22] Filed: Sep. 14, 1993

[30] Foreign Application Priority Data

Sep. 16, 1992 [DE] Germany .................. 42 30 869.0

[51] Int. Cl.$^6$ ............................................ B32B 27/08
[52] U.S. Cl. ..................... 428/515; 428/523; 428/357; 428/516; 428/349
[58] Field of Search .............. 428/35.7, 35.2, 216, 428/218, 515, 517, 519, 523, 349, 516; 525/240

[56] References Cited

U.S. PATENT DOCUMENTS 4,692,379 9/1987 Keung et al. .................. 428/349

FOREIGN PATENT DOCUMENTS

| | | |
|---|---|---|
| 538747 | 4/1983 | European Pat. Off. . |
| 178061 | 4/1986 | European Pat. Off. . |
| 207626 | 11/1990 | European Pat. Off. . |
| 292197 | 11/1991 | European Pat. Off. . |

*Primary Examiner*—Charles R. Nold
*Attorney, Agent, or Firm*—Keil & Weinkauf

[57] ABSTRACT

A packaging film contains
a) a sealing layer of a mixture of from 50 to 80% by weight of a random terpolymer (I) of from 90 to 97% by weight of propylene, from 2 to 6% by weight of ethylene and from 1 to 6% by weight of a $C_4$–$C_{10}$-alk-1-ene and from 20 to 50% by weight of at least one ethylene polymer (II)
b) and a substrate layer of a thermoplastic polymer.

The novel packaging film possesses in particular good sealability over a wide temperature range.

8 Claims, No Drawings

PACKAGING FILM COMPRISING A SEALING LAYER AND A SUBSTRATE LAYER

The present invention relates to a packaging film containing
 a) a sealing layer of a mixture of from 50 to 80% by weight of a random terpolymer (I) of from 90 to 97% by weight of propylene, from 2 to 6% by weight of ethylene and from 1 to 6% by weight of a $C_4$–$C_{10}$-alk-1-ene and from 20 to 50% by weight of at least one ethylene polymer (II)
 b) and a substrate layer of a thermoplastic polymer.

The present invention furthermore relates to a process for the production of the novel packaging film and the use of the novel packaging film in the food sector.

It is known that plastics can be used as packaging materials since they can be easily processed, have a low weight and are resistant to environmental influences and their appearance can be greatly changed. Polyolefins, especially polymers of propylene and of ethylene, are particularly important in terms of quantity. In the packaging sector, plastics are predominantly used in the form of films.

European Patents EP-B 0178 061 and EP-B 0292 197 describe packaging films which consist of a blend of three different plastics, an ethylene polymer, a but-1-ene polymer and a propylene polymer. These packaging films possess, inter alia, good optical properties. They are also suitable for forming peelable tight seals.

Furthermore, EP-B 0207 626 discloses packagings comprising a container which contain a heat-sealed layer of various polypropylene resins which differ from one another in particular because of their substantially different flows. Such packagings may be relatively easily sealed and are therefore used in particular for storing food.

In some applications, packaging materials must have certain, often contradictory properties which cannot always be satisfactorily realized with the conventional packaging. Packaging films, for example, must in some cases meet considerable requirements with regard to their mechanical stability and their impermeability, which they must possess while at the same time having good processibility and being easily removable. In addition, such packaging films should be sealable at very low temperatures and with a very large number of other films or moldings.

It is an object of the present invention to remedy the disadvantages described and to provide an improved packaging film which possesses high mechanical stability and good impermeability, is easy to remove and can be sealed in a very simple manner.

We have found that this object is achieved by a novel packaging film containing
 a) a sealing layer of a mixture of from 50 to 80% by weight of a random terpolymer (I) of from 90 to 97% by weight of propylene, from 2 to 6% by weight of ethylene and from 1 to 6% by weight of a $C_4$–$C_{10}$-alk-1-ene and from 20 to 50% by weight of at least one ethylene polymer (II)
 b) and a substrate layer of a thermoplastic polymer.

The sealing layer a) used in the novel packaging film preferably contains from 60 to 80% by weight of a random terpolymer (I) and from 20 to 40% by weight of at least one ethylene polymer (II).

The random terpolymers (I) used are in particular terpolymers which consist of from 92 to 95% by weight of propylene, from 3 to 5% by weight of ethylene and from 1.5 to 4% by weight of a $C_4$–$C_{10}$-alk-1-ene. $C_4$–$C_{10}$-Alk-1-enes should preferably be understood as meaning but-1-ene, pent-1-ene, hex-1-ene, hept-1-ene or oct-1-ene, but-1-ene, hex-1-ene and oct-1-ene being particularly suitable comonomers. A particularly preferred comonomer is but-1-ene.

The random terpolymers (I) to be used according to the invention usually have melting points of from 120° to 135° C., determined by DSC, and melt flow indices of from 2 to 12, in particular from 4 to 8, g/10 min at 230° C. and 2.16 kg, according to DIN 53,735.

The random terpolymers (I) used for this purpose are obtainable, inter alia, by Ziegler-Natta polymerization using titanium-containing and magnesium-containing catalysts, by polymerization with chromium-containing Phillips catalysts or by polymerization with metallocene-containing catalysts (EP-A 45977, U.S. Pat. No. 4 857 613 and EP-A 323 716). The polymerization of the individual comonomers can be carried out both in the gas phase and in suspension or in solution. The random terpolymers (I) are prepared in the polymerization reactors usually used in industry, for example in stirred autoclaves or reactor cascades, by a batchwise, semicontinuous or continuous procedure.

A preferred process for the preparation of the random terpolymers (I) is the gas phase polymerization of the comonomers in the presence of Ziegler-Natta catalysts. A gaseous mixture of propylene, ethylene and a $C_4$–$C_{10}$-alk-1-ene was polymerized, usually at from 60° to 90° C., preferably from 60 to 80° C., and from 20 to 40, preferably from 20 to 35, bar and during an average residence time of the reaction mixture of from 1 to 5, preferably from 1.5 to 4, hours. The gas phase polymerization is preferably carried out in a continuously operated stirred kettle which contains a fixed bed of finely divided polymer which is usually kept in motion by suitable stirring apparatuses. In this process, the ratio of the partial pressure of the propylene on the one hand to that of the ethylene and of the $C_4$–$C_{10}$-alk-1-ene on the other hand is preferably brought to 5:1 up to 100:1. The ratio of the partial pressures of ethylene to the $C_4$–$C_{10}$-alk-1-ene in turn is usually from 1:1 to 50:1 in this case.

For the preparation of the sealing layer a) to be used according to the invention, the random terpolymer (I) and the ethylene polymer or polymers (II) are mixed with one another in a suitable apparatus, for example in an extruder or mixer.

Furthermore, the sealing layer used in the novel packaging film also contains at least one ethylene polymer (II), both homopolymers of ethylene and copolymers of ethylene with other comonomers being understood by this term. Preferred homopolymers are both low density and high density homopolymers of ethylene having densities of from 0.890 to 0.980 $g/cm^3$. Suitable copolymers of ethylene usually also contain minor amounts of unsaturated comonomers, for example of vinyl acetate or of $C_3$–$C_{10}$-alk-1-enes, for example of propylene, but-1-ene, hex-1-ene or oct-1-ene. Particularly preferred sealing layers a) contain an ethylene polymer (II) having a density of from 0.900 to 0.935 $g/cm^3$.

Such ethylene polymers (II) are usually prepared by low pressure polymerization using metal-containing catalysts or by high pressure polymerization using free radical initiators. The polymerization can be carried out batchwise, semicontinuously or continuously using reactors usually employed in industry, in the gas phase, in solution or in a suspension. In such processes, minor amounts of other comonomers, for example vinyl acetate or $C_3$–$C_{10}$-alk-1-enes, may also be polymerized in addition to the ethylene. The preparation processes described here are known to the skilled worker.

The ethylene polymers (II) used in the sealing layer a) are available, inter alia, under the trade name Lupolen® from BASF Aktiengesellschaft. In the sealing layer a), a plurality of different ethylene polymers (II) may also be present.

In addition to the sealing layer a), the novel packaging film also contains at least one substrate layer b) of a thermoplastic polymer. The novel packaging film may furthermore have two or more substrate layers b) of one, two or more thermoplastic polymers.

The term thermoplastic polymers is intended in this context to mean in particular polymers such as polyamides, polystyrenes, polyesters, polyoxyalkylenes, polyurethanes, polyacrylates, polyvinyl chlorides, polycarbonates and polyolefins, polyolefins preferably being used as substrate layers b). Particularly preferred substrate layers b) consist of propylene polymers, for example propylene homopolymers or copolymers of propylene with minor amounts of other $C_2$–$C_{10}$-alk-1-enes. Such propylene polymers usually have melt flow indices of from 0.5 to 15, in particular from 1.0 to 10, g/10 min, according to DIN 53,735, at 230° C. and 2.16 kg. These thermoplastic polymers can be prepared by processes familiar to the skilled worker, so that reference may be made to the relevant literature in this respect. The preferably used polyolefins can be prepared similarly to the preparation of the random copolymers (I) or the ethylene polymer (II).

In the novel packaging film, the layer thicknesses of the sealing layer a) are preferably from 2 to 20 μm, in particular from 3 to 10 μm, and those of the substrate layer b), which may also consist of two or more substrate layers b), are preferably from 30 to 350 μm, in particular from 70 to 250 μm.

Up to 50, preferably from 10 to 30, % by weight of conventional fillers, for example chalk, talc, kaolin or barium sulfate, may also be present, both in the sealing layer a) and in the substrate layer b). Furthermore, additives, such as stabilizers, lubricants, antioxidants, antistatic agents, UV absorbers, viscosity modifiers, antiblocking agents, impact modifiers, dulling agents, flameproofing agents, biostabilizers, nucleating agents or curing agents, may be mixed with these layers a) and b).

The novel packaging film is usually produced by applying the sealing layer a) very uniformly to the substrate layer b). Such production processes for multilayer films are usually carried out by the coating method, the lamination method or the coextrusion film blowing/sheet coextrusion method.

In the coating method, for example, the coating material to be used is first applied to a substrate web, after which the operations of gelling, cooling, removal and winding are carried out. In the actual coextrusion coating, coating is effected in a coating apparatus with a melt film which is melted in an extruder and extruded via a slot die and may consist of one or more polymer layers. The resulting laminate of the sealing layer a) and the substrate layer b) is then cooled and calendered in a unit comprising cooling pressure rollers. The laminated sheet is then wound in an appropriate winding station.

In the lamination method, the operations of application of the coating material to the substrate web, calendering and cooling, removal and winding are likewise carried out similarly to the coating method. In the actual extrusion lamination, a prefabricated substrate web is run into a calender which has 3 or 4 rolls. The substrate web is coated before the first roll nip with a melt film which is melted in an extruder and extruded via a slot die. Before the second roll nip, a second prefabricated web is run in. The resulting total laminate is calendered on passing through the second roll nip, then cooled, removed and wound in a winding station.

In the coextrusion film blowing or sheet coextrusion method, in general the mixture of the sealing layer a) and the thermoplastic polymer of the substrate layer b) are first melted in different extruders under suitable conditions and then combined in the form of the melt streams in a coextrusion die, with formation of a multilayer melt stream. Extrusion, removal and cooling of the multilayer melt sheet and winding of the laminate are then carried out. This coextrusion method is preferably used for the production of the novel packaging film. Both unoriented or oriented flat films and tubular films can be produced in this manner.

Such processes are usually carried out at from 170° to 280° C. and from 70 to 200 bar and during average throughput times of from 5 to 20 minutes.

The novel packaging film possesses in particular good adhesion between the sealing layer a) and the substrate layer b) without additional adhesion promoters or primers having to be present. Moreover, the novel packaging film has high mechanical stability and good impermeability, in particular to air. It can be readily processed over a wide sealing temperature range and has good properties with regard to its peelability.

Owing to their good peelability, the novel packaging films are particularly suitable for the food sector. Furthermore, they can also be used as packaging materials for other consumer sectors, for example in the entertainment sector.

EXAMPLES

I. Production of a novel packaging film

Coextruded films were produced by sheet extrusion by a main extruder (screw diameter 90 mm, screw length 25×diameter), in which the main layer was plastified, and via a side extruder (screw diameter 45 mm, screw length 25×diameter) for plastifying the sealing layer a).

The melt streams emerging from both extruders were combined via an adapter system, applied one on top of the other in the form of layers and extruded via a slot die. The melt temperature in the main extruder was 245° C. in each case and that in the side extruder was 225° to 240° C.

The films obtained consisted of a sealing layer a) having a layer thickness of 10 μm and a substrate layer b) having a layer thickness of 75 μm.

The substrate layer b) consisted of a propylene copolymer with 7.0% by weight of polymerized ethylene and a melt flow index of 4.0 g/10 min at 230° C. and 2.16 kg, according to DIN 53,735. The sealing layer a) consisted of the polymer blends described in the Table below. The two layers were each coextruded without the use of an adhesion promoter.

II. Properties of the novel packaging film

The packaging film obtained under (I) was tested with regard to its sealability and peelability.

The packaging film was sealed onto a propylene homopolymer film having a melt flow index of 3.5 g/10 min at 230° C. and 2.16 kg, according to DIN 53,735, and a layer thickness of 200 μm. The contact area of the sealing bar was 150×10 mm, the sealing pressure was 0.7N/mm2 and the sealing time was 0.5 second. The sealing temperatures were from 110° to 180° C. The seals produced in this manner were tested by the tensile test according to ISO 527 in order to determine the quality of the seal and the peel forces required to open the seal.

For this purpose, the free ends of the films sealed with one another were clamped in the tensile test apparatus and were pulled apart at an angle of 180°. The sample width was 15 mm and the peeling speed 100 mm/min.

The peel force required to peel open the seam was recorded in each case as a function of the sealing temperature. Peel forces which are not too high even at low sealing temperatures are desirable.

For the films obtained, the sealing layer was also tested with regard to its transparency.

The results of these measurements are shown in the Table below.

TABLE

| | Blend components in the sealing layer | Mixing ratio [% by weight] | Peel force [N/15 mm] at sealing temperatures of | | | | Transparency of the sealing layer[a] |
|---|---|---|---|---|---|---|---|
| | | | 110° C. | 130° C. | 150° C. | 170° C. | |
| Example | | | | | | | |
| 1 | Random propylene copolymer[b] | 70 | 1.2 | 2.5 | 2.8 | 6.6 | ○ |
| | Ethylene homopolymer[c] | 30 | | | | | |
| 2 | Random propylene copolymer[d] | 70 | 2.6 | 4.5 | 6.5 | 7.8 | ⊕ |
| | Ethylene homopolymer[c] | 30 | | | | | |
| 3 | Random propylene copolymer[d] | 70 | 3.0 | 5.2 | 7.3 | 7.3 | ⊕ |
| | Ethylene homopolymer[e] | 30 | | | | | |
| 4 | Random propylene copolymer[d] | 55 | 0.8 | 1.5 | 2.0 | 2.2 | ○ |
| | Ethylene homopolymer[e] | 45 | | | | | |
| Comparative Example | | | | | | | |
| A | Random propylene copolymer[d] | 70 | 3.0 | 6.5 | 9.0 | 11.2 | ⊖ |
| | Ethylene homopolymer[e] | 25 | | | | | |
| | Polyisobutylene[f] | 5 | | | | | |
| B | Random propylene copolymer[d] | 85 | 3.6 | 6.2 | 9.5 | 13.0 | ⊕ |
| | Ethylene homopolymer[e] | 15 | | | | | |

[a] Qualitative evaluation of the transparency: ⊕ good  ○ moderate  ⊖ poor
[b] 2.5% by weight of polymerized ethylene; melt flow index: 8.0 g/10 min at 230° C. and 2.16 kg, according to DIN 53,735
[c] Density: 0.918 g/cm$^3$; melt flow index 7.0 g/10 min at 190° C. and 2.16 kg, according to DIN 53,735
[d] 5.0% by weight of polymerized ethylene and but-1-ene; melt flow index 6.0 g/10 min at 230° C. and 2.16 kg, according to DIN 53,735
[e] Density: 0.930 g/cm$^3$; melt flow index: 3.5 g/10 min at 190° C. and 2.16 kg, according to DIN 53,735
[f] Molecular weight $M_r$ (viscosity average): $1.5 \cdot 10^6$ The comparison between the novel Examples 1 to 4 and Comparative Examples A and B shows that the novel packaging films can be more readily peeled off (lower peel force) at the same sealing temperature. Moreover, the film of Comparative Example A exhibits poor transparency of the sealing layer compared with that of Examples 1 to 4.

We claim:

1. A packaging film comprising a laminate of a) and b), wherein a) is a sealing layer comprising a mixture of a random terpolymer and at least one ethylene homopolymer, and b) is a substrate layer comprising a thermoplastic polymer, wherein the sealing layer comprises a mixture of from 50 to 80% by weight of the random terpolymer and from 20 to 50% by weight of at least one ethylene homopolymer, and wherein the random terpolymer is a polymer of the monomers propylene, ethylene and a $C_4$–$C_{10}$-alk-1-ene and wherein the random terpolymer comprises 90–97% by weight of propylene, 2–6% by weight ethylene, and 1–6% by weight of the $C_4$–$C_{10}$-alk-1-ene.

2. A packaging film as claimed in claim 1, wherein a sealing layer a) contains from 60 to 80% by weight of the random terpolymer (I) and from 20 to 40% by weight of at least one ethylene homopolymer.

3. A packaging film as claimed in claim 1, wherein the sealing layer a) contains a random terpolymer which consists of from 92 to 95% by weight of propylene, from 3 to 5% by weight of ethylene and from 1.5 to 4% by weight of a $C_4$–$C_{10}$-alk-1-ene.

4. A packaging film as claimed in claim 1, wherein the sealing layer a) contains a random terpolymer in which the $C_4$–$C_{10}$-alk-1-ene.

5. A packaging film as claimed in claim 1, wherein the sealing layer a) contains an ethylene homo polymer (II) having a density of from 0.900 to 0.935 g/cm$^3$.

6. A packaging film as claimed in claim 1, wherein the substrate layer b) consists of a polyolefin.

7. A packaging film as claimed in claim 1, wherein the substrate layer b) consists of a propylene polymer.

8. A packaging film as claimed in claim 1, wherein the sealing layer a) has a layer thickness of from 2 to 20 μm and the substrate layer b) has a layer thickness of from 30 to 350 μm.

* * * * *

UNITED STATES PATENT AND TRADEMARK OFFICE
CERTIFICATE OF CORRECTION

PATENT NO.: 5,451,468

DATED: September 19, 1995

INVENTOR(S): SEILER et al.

It is certified that error appears in the above-identified patent and that said Letters Patent is hereby corrected as shown below:

Column 6,

Claim 2, line 14, delete "a" and substitute --the--; line 16, delete "(I)".

Claim 4, line 25, after "ene" insert --is butoluene--.

Claim 5, line 22, delete "(II)".

Signed and Sealed this

Nineteenth Day of December, 1995

Attest:

BRUCE LEHMAN

Attesting Officer   Commissioner of Patents and Trademarks